United States Patent Office 3,654,278
Patented Apr. 4, 1972

3,654,278
ARYL-SUBSTITUTED TETRAKETOPIPERAZINE MONOMERS
Marvin T. Tetenbaum, Convent, N.J., assignor to Allied Chemical Corporation, New York, N.Y.
No Drawing. Filed Oct. 29, 1969, Ser. No. 872,366
Int. Cl. C07d 51/68
U.S. Cl. 260—268 PH         2 Claims

ABSTRACT OF THE DISCLOSURE

Compounds of the structure:

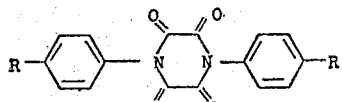

wherein R is —$COOR_1$,

or —Br, wherein $R^1$ is H, $CH_3$, $C_2H_5$ or phenyl, are useful monomers for the preparation of polymers which, when blended with nylons, polyethylene terephthalate or poly (1,4-cyclohexylenedimethylene terephthalate), advantageously modify the properties thereof. The compound of the above structure, wherein R=$CH_3$, has insecticidal properties.

BACKGROUND OF THE INVENTION

Field of the invention

This invention relates to novel tetraketopiperazines. Certain of these tetraketopiperazines can be condensation polymerized with polyols to form polyesters. These polyesters when melt blended with nylons or other polyesters such as polyethyleneterephthalate (PET) or poly (1,4-cyclohexylenedimethylene terephthalate) advantageously modify the physical properties thereof. Another of my novel tetraketopiperazine has insecticidal properties. Still another can form novel polyethers.

Description of the prior art

Polyesters such as PET and poly(1,4-cyclohexylenedimethylene terephthalate) are widely used, particularly in the form of fibers, either alone or combined with cotton. To date, all large-scale production polyesters have been based on terephthalic acid. Such polyesters, although, of course possessing many outstanding properties, are always capable of improvement. We have found that by incorporating into such terephthalic acid derived polyesters a minor amount of polyester having recurring units of the structure:

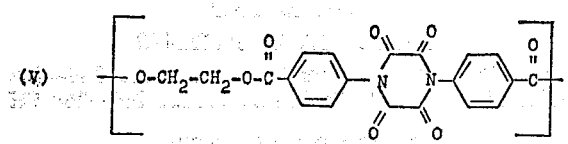

i.e., esters derived from ethylene glycol and acids of the structure:

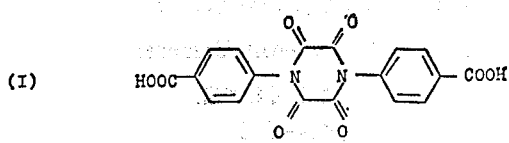

improves the dyeability and tenacity of such phthalic acid-derived polyester yarns. Additionally, incorporation into nylon 6 or 6,6 of polyesters derived from acids of structure (I) reduces the flat-spotting tendency of tires containing such modified nylon yarn.

SUMMARY OF THE INVENTION

Novel compounds have been prepared which can be represented by the following generic formula:

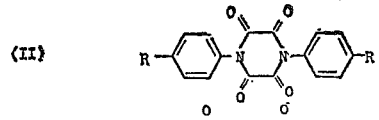

wherein R is $CH_3$, Br

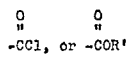

wherein R' is H, $CH_3$, $C_2H_5$ or phenyl. These compounds are prepared by the following synthetic method:

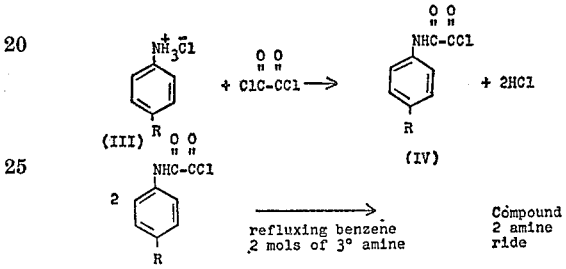

Compounds (III) are the hydrochloride salts of the aniline substituted with group R in a para-position. All such compounds are readily available, as is

(oxalyl chloride.)

The reaction of compound (III) with oxalyl chloride is most advantageously carried out by simply refluxing a mixture of the two compounds for from 2 to 24 hours with the oxalyl chloride preferably being in at least about 50% molar excess. The reaction mixture is then stripped at reduced pressure to remove the HCl and excess oxalyl chloride. The residue consists of crude compound (IV). It can be further reacted directly, or purified by recrystallization, from an aromatic solvent such as benzene or toluene. Compound (IV) is dimerized to form compound (II) by refluxing for from 8 to 24 hours in an inert solvent such as benzene in the presence of an aliphatic $C_3$ to $C_{30}$ tertiary amine which reacts with the HCl evolved in the dimerization. Triethylamine has been found particularly suitable. The amount of amine present is not critical although preferably at least one mol of amine per mol of compound (IV) will be used so as to neutralize all the HCl formed. The product (II), plus triethylamine hydrochloride, will ordinarily precipitate on cooling the reaction solution to ambient temperature. If all the product (II) does not precipitate, the benzene can be stripped off at reduced pressure. The triethylamine hydrochloride present in the residue can be washed free from the product with water leaving behind product (II). It may be further purified by recrystallization from a solvent such as dimethyl sulfoxide, if desired.

As heretofore indicated, the polyesters derived from acids of the structure (I) are valuable additives for nylons or other polyesters. These polyesters may be prepared either directly from the acid (I) by reaction with a polyol such as ethylene glycol or preferably by reaction of the polyol with the acid chloride i.e., compound (II) wherein R is

or by transesterification of the acid ester, i.e., compound (II) wherein

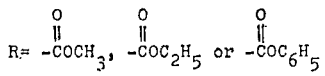

In all cases the polyester will have the structure (V).

Compounds of structure (II), wherein R is Br, react with the alkali metal alcoholate derivative of a polyol such as ethylene glycol to form polyethers having recurring units of the structure:

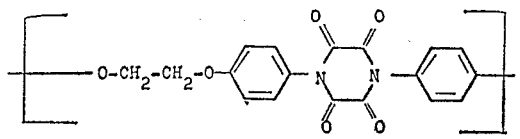

The polyethers are plasticizers for nylon 6.

EXAMPLE 1 p-Carbethoxyoxanilyl chloride

A mixture of 7.5 g. (0.037 mol) of ethyl p-aminobenzoate hydrochloride and 34 ml. (0.39 mol) oxalyl chloride was stirred and refluxed overnight. The resulting hazy yellow solution was filtered (under dry nitrogen) and the filtrate evaporated at reduced pressure. The residual oil rapidly solidified to a pale-yellow crystalline solid, 9.2 g. (97%), M.P. 113° C.; melting point after two benzene recrystallizations, 123–124° C. Infrared spectrum $^v$max. cm.$^{-1}$; NH stretch, 3330; amide, 1705 and 1545; COCl, 1785; and p-substituted aromatic, 855.

*Elemental analysis.*—Calcd. for $C_{11}H_{10}ClNO_4$ (percent): C, 51.68; H, 3.94; Cl, 13.87; N, 5.48. Found (percent): C, 51.93; H, 3.99; Cl, 14.00; N, 5.61.

EXAMPLE 2

1,4-bis(p-carbethoxyphenyl)tetraketopiperazine

A mixture of 7.7 g. (0.03 mol) p-carbethoxyoxanilyl chloride, as prepared in Example I, 4.5 ml. triethylamine, and 150 ml. benzene was stirred at reflux for 24 hours. On cooling to room temperature, precipitation occurred. The cooled mixture was filtered and the collected precipitate washed successively with water, ethanol, and ether, affording 3.7 g. (55.6%) of product. It was recrystallized from dimethyl sulfoxide, M.P. 357–359° C. Infrared spectrum, $^v$max. cm.$^{-1}$ board carbonyl, 1710–1740; CO stretch, 1188, 1100, 1275; p-substituted aromatic, 856.

*Analysis.*—Calcd. for $C_{22}H_{18}N_2O_8$ (percent): C, 60.28; H, 4.14; N, 6.39. Found (percent): C, 59.91; H, 4.18; N, 6.24.

EXAMPLE 3 p-Tolyloxanilyl chloride

A mixture of 5.3 g. (0.037 mol) p-toluidine hydrochloride and 34 ml. (0.39 mol) oxalyl chloride was stirred at reflux for one hour and the resulting yellow solution allowed to stand overnight. Evaporation under vacuum left an oily residue that solidified when hexane was added. The solid 6.2 g. (85%) was recovered and recrystallized twice from benzene-hexane giving pale yellow needles, M.P. 93.5–94°. Infrared spectrum, $^v$max. cm.$^{-1}$; NH stretch, 3370; amide, 1725 and 1530; COCl, 1770; p-substituted aromatic, 820 and 801.

*Analysis.*—Calcd. for $C_9H_8ClNO_2$ (percent): C, 54.70; H, 4.08; N, 7.09. Found (percent): C, 54.85; H, 4.17; N, 7.10.

EXAMPLE 4

1,4-bis(p-tolyl)tetraketopiperazine

A mixture of 0.42 g. (2.13 mmol) p-tolyloxanilyl chloride, 0.3 ml. triethylamine, and 20 ml. benzene was stirred at reflux for 24 hours. On cooling, a precipitate formed which was collected and washed successively with water, ethanol and ether, affording 0.09 g. of (26.2%) product. Following recrystallization from dimethyl sulfoxide, the compound sublimed slowly at about 270° C. Infrared spectrum, $^v$max. cm.$^{-1}$; imide carbonyls, 1690, 1712 doublet; p-substituted aromatic 812.

*Analysis.*—Calcd. for $C_{18}H_{14}N_2O_4$ (percent): C, 67.08; H, 4.38; N, 8.69. Found (percent): C, 67.08; H, 4.69; N, 8.54.

EXAMPLE 5 p-Bromooxanilyl chloride

A mixture of 20.9 g. (0.1 mol) p-bromoaniline hydrochloride in 100 ml. benzene containing 17.2 ml. (0.2 mol) oxalyl chloride was stirred at reflux overnight. Only partial solution occurred. Filtration of the hot mixture (under dry nitrogen) removed 3.7 g. of a solid which was shown by infrared spectrographic analysis to be a mixture of di(p-bromophenyl) oxamide and the desired tetraketopiperazine. Upon cooling the filtrate, a yellow solid precipitated which was recovered by filtration. Recrystallization from benzene afforded the desired acid chloride as yellow needles, 9.8 g. (37.2%), M.P. 143–145° C. Infrared spectrum, $^v$max. cm.$^{-1}$: NH stretch, 3270; amide, 1690 and 1536; carbonyl, 1770 and 1750, p-substituted aromatic 824.

*Analysis.*—Calcd. for $C_8H_5BrClNO_2$ (percent): C, 36.61; H, 1.92; N, 5.34. Found (percent): C, 36.81; H, 2.14; N, 5.36.

EXAMPLE 6

1,4-bis(p-bromophenyl)tetraketopiperazine

A mixture of 4.5 g. (0.017 mol) p-bromooxanilyl chloride, as prepared in Example 5, 2.5 ml. triethylamine, and 60 ml. benzene was stirred at reflux for 24 hours. Work-up as described in Example 4 afforded 2.5 g. (64.6%) of product. Recrystallization from dimethyl sulfoxide yielded an off-white solid that sublimed slowly at 370° C. Infrared spectrum $^v$max. cm.$^{-1}$: imide carbonyls-broad band 1710–1740, p-substituted aromatic 821.

*Analysis.*—Calcd. for $C_{16}H_8Br_2N_2O_4$ (percent): C, 42.51; H, 1.78; N, 6.20. Found (percent): C, 41.89; H, 1.72; N, 6.53.

I claim:

1. A compound of the structure:

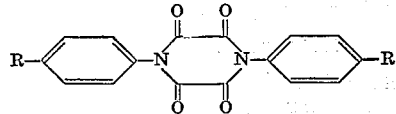

wherein R is

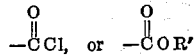

wherein R' is H, $CH_3$, $C_2H_5$ or phenyl.

2. The compound of claim 1 which is 1,4-bis(p-carbethoxyphenyl)tetraketopiperazine.

References Cited

UNITED STATES PATENTS

| | | | |
|---|---|---|---|
| 3,493,575 | 2/1970 | Tomalia | 260—268 |
| 3,560,483 | 2/1971 | Svokos | 260—268 PH |

OTHER REFERENCES

Buckley et al., Jour. Chem. Soc. (1956), p. 1888–9.
Meyer, Ber. vol 10, p. 1967 (1877).

DONALD G. DAUS, Primary Examiner

U.S. Cl. X.R.

260—75 R, 268 DK; 424—250